United States Patent [19]

Haemer

[11] 4,331,579

[45] May 25, 1982

[54] ADHESIVE TO ADHERE IMPERVIOUS AND FELT BACKED VINYL SHEET MATERIAL TO DAMP CONCRETE

[75] Inventor: Laurence F. Haemer, Newtown, Pa.

[73] Assignee: Congoleum Corporation, Kearny, N.J.

[21] Appl. No.: 232,899

[22] Filed: Feb. 9, 1981

Related U.S. Application Data

[63] Continuation-in-part of Ser. No. 81,758, Oct. 4, 1979, abandoned.

[51] Int. Cl.$^3$ .......................... C08K 5/10; C08K 5/15
[52] U.S. Cl. .......................................... 524/5; 524/4; 524/7

[58] Field of Search ..................... 260/30.4 R, 31.2 R, 260/32.8 R, 42.13, 30.2, 31.6, 31.8 R, 32.4, 32.6 R, 33.4 R; 106/90

[56] References Cited

U.S. PATENT DOCUMENTS 2,672,793  3/1954  Rowe et al. ........................... 106/90

Primary Examiner—Harry Wong, Jr.
Attorney, Agent, or Firm—Shlesinger, Arkwright, Garvey & Dinsmore

[57] ABSTRACT

A solvent-based, plasticized vinyl resin adhesive containing Portland cement that adheres impervious and felt backed vinyl sheet material to damp concrete.

3 Claims, No Drawings

ADHESIVE TO ADHERE IMPERVIOUS AND FELT BACKED VINYL SHEET MATERIAL TO DAMP CONCRETE

This application is a continuation-in-part of application Ser. No. 081,758, filed Oct. 4, 1979, now abandoned.

BACKGROUND AND OBJECTS OF THE INVENTION

Many types of adhesives are used to adhere surface covering material to such surfaces as floors, walls, counter tops or the like. The type of adhesive used depends upon the nature of the surface covering material, the surface being covered and the conditions to which the surface covering will be subjected. Surface coverings of the type formed from a polyvinyl halide layer, with or without a felt backing layer such as cellulose or asbestos fibers, are often applied to wood or masonite using the adhesive disclosed in U.S. Pat. No. 4,036,673 issued July 19, 1977 to R. Murphy et al, which is a foamed latex adhesive. Although this adhesive is satisfactory on a variety of surfaces, it fails to adhere to damp concrete. Latex adhesives in general dry extremely slowly on asbestos felt backed surface coverings when laid on even slightly damp concrete, and these adhesives may not dry at all on impervious backings under these conditions. During the 1950's, a two-part latex hydraulic cement was used as an adhesive for rubber tile. This adhesive is suitable for use on damp concrete as it dries by reaction of the hydraulic cement with water, but it fails when used with plasticized vinyl surface coverings due to migration of plasticizer softening the adhesive. Two part epoxy adhesives are available, but they are expensive, inconvenient, and have limited adhesion to plasticized vinyl compounds, and urethane adhesives are difficult to handle and expensive.

It is therefore a primary object of this invention to provide an inexpensive one-part adhesive to adhere impervious and felt backed vinyl sheet material to damp concrete.

DESCRIPTION OF THE INVENTION

The invention is a solvent based vinyl resin-plasticizer adhesive that employs Portland cement to adhere to damp concrete. The surface covering materials with which the invention is useful as an adhesive include sheets of vinyl, vinyl-asbestos, vinyl foamed vinyl asbestos, cellulose backed vinyl and the like, where the term "vinyl" refers to conventional vinyl resins used in the surface covering industry such as polyvinyl halide, polyvinyl acetate homopolymers or copolymers of vinyl halides with vinyl acetate, styrene, etc.

The particular solvent chosen for use in the invention must, of course, be capable of solvating the particular resin chosen for use in the adhesive, and it must also be a reasonably good solvent for the vinyl sheet material. Poor solvents for vinyl, such as toluene, cause swelling and buckling of unbacked vinyl sheeting, whereas a solution containing a good solvent for vinyl may soften the vinyl sheet somewhat but will not cause swelling and buckling. A very satisfactory solvent for use in the invention is tetrahydrofuran, although other vinyl solvents such as cyclohexanone, methyl ethyl ketone, methyl isobutyl ketone, diacetone alcohol, isophorone, acetone, nitrobenzene 2-nitro propane, dichlorethane, dioxane, dimethyl formamide, N-methyl-2-pyrrolidone, etc. may be used. The invention should contain from 35% to 65% vinyl solvent by weight of the total composition.

The vinyl resin chosen for use in the invention is preferably a polyvinyl halide homopolymer, although many of the polyvinyl resins used by the surface covering industry, such as copolymers of vinyl halides with vinyl acetate, vinylidene chloride, maleic anhydride or acrylonitrile, or mixtures of similar resins, can also be used. Resins of higher molecular weight will impart a higher viscosity to the adhesive. The invention should contain from about 5% to about 30% and preferably from about 6% to about 15% resin, by weight, of the total composition.

Most vinyl resins by themselves are too brittle to make a satisfactory adhesive, so the resin is plasticized for increased flexibility. The conventional ester plasticizers used with vinyl resins may be subject to hydrolysis in the alkaline conditions existing on a concrete slab and, therefore, may not be desirable for use with the invention. The ester plasticizer must be selected with regard to the conditions in the environment of its use. Depending on the conditions on a concrete slab, phthalate esters of 4 to 10 carbon straight chain and branched chain aliphatic alcohols are suitable. Diethylene glycol dibenzoate and butyl benzyl phthalate are also suitable plasticizers. An acrylonitrile rubber, i.e. a butadiene-acrylonitrile copolymer, can be used as a plasticizer, although this will result in an adhesive with a very high viscosity, and may be difficult to work with. The plasticizer used must, of course, be soluble in the chosen solvent and it must be compatible with the vinyl resin used. A satisfactory plasticizer is a copolymer of vinyl acetate with ethylene, which is soluble in tetrahydrofuran. Other plasticizers of use in the invention are polyesters such as Paraplex G-25, G-31 or G-50 (available from Rohm and Haas Company of Philadelphia, Pennsylvania), thermoplastic polyester urethanes such as Perumethane U-24-303 (available from Permuthane Division of Beatrice Foods Company of Chicago, Illinois) and the like. The invention should contain about 30 to about 250 parts plasticizer per 100 parts resin, with a range of about 50 to about 150 parts plasticizer per 100 parts resin being particularly effective. The range of about 30 to about 250 parts plasticizer per 100 parts resin is equivlalent to from 5 to 30% plasticizer by weight of the total composition.

Portland cement is added to the mixture of the range of from 25% to 60% by weight of the total composition. Portland cement is a hydraulic cement, one that absorbs water to cure, and can absorb up to approximately 35% of its weight in water. Thus, the Portland cement aids in adhesion to damp concrete by removing the water which would interfere with the adhesion of the vinyl resin and by swelling and binding in the pores of the concrete.

The viscosity of the adhesive can be increased by adding any of the fillers used in the processing of vinyl resins, such as fine particles of silica. The viscosity is also greatly affected by the amount of solvent used. Minor amounts of heat and light stabilizers, well known in the surface covering industry, are incorporated in the invention to reduce the effects of degradation by light and heat.

The method of producing the adhesive is simply to mix the resin with the plasticizer, dissolve the mixture in the solvent and add the suitable stabilizers and the desired amount of Portland cement. The viscosity of the adhesive can then be adjusted by adding fillers or more solvent, as necessary.

The "open time" of the adhesive is dependent upon the method of application. If the adhesive is applied in a bead, as from a caulking gun, the open time is about 15 to 20 minutes. If a layer of adhesive is applied with a trowel, the open time will be somewhat less, depending on the thickness of the layer. The concrete to which the adhesive is applied should be relatively dry at the time of application, but the Portland cement will absorb any moisture present at the time of application or subsequently.

The following example will further illustrate the embodiment of this invention.

EXAMPLE I

The adhesive was formulated by thoroughly mixing the following ingredients:

|  | Weight (gms) |
|---|---|
| Polyvinyl chloride | 100 |
| Ethylene-vinyl acetate copolymer[1] (Plasticizer) | 150 |
| Tetrahydrofuran | 583 |
| Stabilizer | 3 |
| Epoxidized soybean oil | 2 |
| Portland cement | 625 |

[1] Sold by DuPont under the name Elvaloy 742.

The adhesive is successful in adhering impervious and felt backed vinyl flooring to damp and dry concrete and to wood. There appears to be no decline in the bond between the surface covering and the substrate with age, and no buckling of the surface covering occurs.

While this invention has been described, it will be understood that it is capable of further modification, and the application is intended to cover any variations, uses and/or adaptations of the invention following in general, the principles of the invention and including such departures from the present disclosure as come within known or customary practice in the art to which the invention pertains, and as may be applied to the essential features hereinbefore set forth, as fall within the scope of the invention or the limits of the appended claims.

What is claimed is:

1. A one-part, solvent-based, plasticized vinyl resin adhesive for securing impervious and felt backed vinyl sheet material to a subsurface, said adhesive consisting essentially of:
   25% to 60% Portland cement;
   5% to 30% vinyl resin wherein said vinyl resin is selected from the group consisting of vinyl halide homopolymer and vinyl halide copolymer;
   5% to 30% plasticizer for said vinyl resin wherein said plasticizer is selected from the group consisting of: phthalate esters of 4 to 10 carbon straight chain and branched chain aliphatic alcohols, diethylene glycol dibenzoate, butyl benzyl phthalate, butadieneacrylonitrile copolymer, ethylene-vinyl acetate copolymer, polyesters, and thermoplastic polyester urethanes; and,
   35% to 65% solvent for said vinyl resin, said solvent being selected from the group consisting of: tetrahydrofuran, cyclohexanone, methyl ethyl ketone, methyl isobutyl ketone, diacetone alcohol, isophorone, acetone, nitrobenzene 2-nitro propane, dichlorethane, dioxane, dimethyl formamide, and N-methyl-2-pyrrolidone.

2. The adhesive composition of claim 1 wherein said vinyl resin is selected from the group consisting of: vinyl halide homopolymer, vinyl halide-vinyl acetate copolymer, vinyl halide-vinylidene chloride copolymer, vinyl halide-maleic anhydride copolymer, and vinyl halideacrylonitrile copolymer.

3. A one-part, solvent-based, plasticized vinyl resin adhesive for securing impervious and felt backed vinyl sheet material to a subsurface, said adhesive consisting essentially of:
   25% to 60% Portland cement;
   5% to 30% polyvinyl chloride;
   5% to 30% ethylene-vinyl acetate copolymer; and,
   35% to 65% tetrahydrofuran.

* * * * *